(12) United States Patent
Butterfield

(10) Patent No.: US 6,687,767 B2
(45) Date of Patent: Feb. 3, 2004

(54) EFFICIENT DIRECT MEMORY ACCESS TRANSFER OF DATA AND CHECK INFORMATION TO AND FROM A DATA STORAGE DEVICE

(75) Inventor: David A. Butterfield, Broomfield, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 253 days.

(21) Appl. No.: 10/032,598

(22) Filed: Oct. 25, 2001

(65) Prior Publication Data

US 2003/0084212 A1 May 1, 2003

(51) Int. Cl.⁷ .............................. G06F 13/28
(52) U.S. Cl. ..................................... 710/22
(58) Field of Search ....................... 710/22, 24, 72, 710/308; 711/119, 206

(56) References Cited

U.S. PATENT DOCUMENTS

| | | | | |
|---|---|---|---|---|
| 4,638,477 A | * | 1/1987 | Okada et al. | 370/400 |
| 4,751,634 A | * | 6/1988 | Burrus et al. | 710/63 |
| 5,522,076 A | * | 5/1996 | Dewa et al. | 713/2 |
| 5,579,503 A | * | 11/1996 | Osborne | 711/119 |
| 5,809,561 A | * | 9/1998 | Sheffield et al. | 711/206 |
| 6,434,645 B1 | * | 8/2002 | Parvin et al. | 710/72 |

* cited by examiner

*Primary Examiner*—Kim Huynh
*Assistant Examiner*—Harold Kim
(74) *Attorney, Agent, or Firm*—Beyer Weaver & Thomas LLP

(57) ABSTRACT

The invention provides efficient apparatus and methods for using direct memory access (DMA) to store and retrieve data and associated check information in fixed-size blocks on a data storage device. A DMA controller of the invention obtains check information from computer main memory rather than computing the check information internally. In accordance with some embodiments of the invention, the DMA controller implements additional registers to specify, for example, the location of check information in computer main memory. The DMA controller itself carries out interleaving of data with its associated check information as it transfers information between main memory and the storage device. In accordance with some aspects of the invention, scatter/gather capability is supported.

56 Claims, 8 Drawing Sheets

221

| 0 | D0 | 1536 bytes |
|---|----|------------|
| 1 | D3 | 1024 bytes |
| 2 | D5 | 512 bytes  |
| 3 | D6 | 1024 bytes |

| 0 | D0 | 1536 bytes |
|---|----|------------|
| 1 | D3 | 1024 bytes |
| 2 | D5 | 512 bytes  |
| 3 | D6 | 1024 bytes |

225

| 0 | C0 | 24 bytes |
|---|----|----------|
| 1 | C3 | 16 bytes |
| 2 | C5 | 8 bytes  |
| 3 | C6 | 16 bytes |

FIG. 2F

EFFICIENT DIRECT MEMORY ACCESS TRANSFER OF DATA AND CHECK INFORMATION TO AND FROM A DATA STORAGE DEVICE

FIELD OF THE INVENTION

This invention relates to computer systems; more particularly, to methods and apparatus for transferring data and check information between computer main memory and data storage devices by means of direct memory access.

BACKGROUND OF THE INVENTION

Computer direct access data storage devices are typically organized into fixed-size blocks of data storage. For example, a computer disk drive may organize data storage into a number of blocks of data, each block holding 512 bytes of data, and each block having a unique logical block address, with the blocks being sequentially numbered starting with block zero. Other block addressing methods are also in use, including specifying cylinders, tracks, and sectors; but again, each block has a unique address, and the blocks are considered to appear on the device in a well-defined logical order. Other storage media such as tapes may also be organized into fixed-size blocks, depending on the application.

A substantial portion of the work carried out by a computer system is the storage and retrieval of data to and from data storage devices (I/O). In early computer systems this work was carried out by the central processing unit (CPU), requiring the use of a substantial portion of the CPU's available computing capacity to perform the detailed steps of the I/O. However, in modern systems the mechanics of data transfer to and from storage devices is often carried out by a separate direct memory access (DMA) controller. FIG. 1A shows a simplified block diagram of such a system, shown at 101. System 101 has a CPU 103, main memory 105, DMA controller 107, storage medium 109, and communication bus 111. In systems like 101, to initiate the I/O data transfer, CPU 103 programs DMA controller 107 with the information it requires, and issues a command (via communication bus 111) to begin the transfer. The CPU can then attend to other computations while the DMA controller carries out the detailed steps of the transfer. Thus, DMA controller 107 serves as an intermediary between main memory 105 and storage medium 109. When the I/O operation is complete, CPU 103 is informed of the I/O completion by DMA controller 107, whereupon the CPU may make use of the results of the transfer. In this way, most of the work required to carry out the I/O is offloaded from the CPU, thus freeing the CPU to carry out other work. For example, the CPU may perform processes such as interchange with main memory 105.

To program a DMA device, a CPU typically specifies such information as: a start address in main memory to be used for the data transfer, the length of the data to be transferred, whether data should be transferred from the device to main memory ("read") or from main memory to the device ("write"), and for direct access devices, the address of the block of data on the storage device.

Often it is desired to transfer more than one block of data to or from a storage device in a single I/O operation. In most cases the length of such transfers are constrained to be integral multiples of the storage device's block size. FIG. 1B depicts a scenario 113, wherein data is transferred from main memory 105 to a storage medium 109, via DMA controller 107. If a CPU specifies to DMA controller 107 a length of more than one block of data, the I/O operation transfers data from sequential addresses in main memory, beginning at the specified start address, to sequential blocks in storage medium 109. The data is stored beginning at a specified block address, or in some devices, at an implicit current location on the storage medium. The DMA controller typically has registers for main memory start address, data block length, and optionally a storage address associated with a storage medium. Thus, in this example, a chunk of data 4096 bytes (8–512 byte blocks, designated D0–D7) in length is transferred to storage medium 109 in one operation (stored in 8–512 byte blocks, designated B0–B7). By transferring multiple blocks of data in a single I/O operation, the CPU is relieved of the effort of initiating the DMA I/O operation for each of blocks D0–D7 individually.

Often it is necessary or desirable to transfer multiple blocks of data between non-contiguous locations in main memory to a contiguous set of blocks on the data storage device. If the DMA controller only accepts a single main memory start address for any given I/O operation, then only sequentially addressable locations in main memory can be transferred in a single I/O operation. In cases where the granularity constraints of the device are met by the organization of the data in main memory, it may be possible to issue separate I/O commands for each contiguous chunk of memory. However, this would incur the CPU cost of initiating the additional I/O commands, and handling their completion.

To alleviate this problem, some DMA controllers implement what has been called a "scatter/gather" I/O operation. In such operations, instead of being programmed with a single main memory start address and length, the DMA controller is given a list of start addresses and lengths. Data is first transferred beginning with the main memory address specified in the first scatter/gather list element. When this element is exhausted; that is, when the specified length of data for the element has been transferred, the next element of the list is used to determine the next set of main memory addresses to be used in the transfer. In this way, a single I/O operation can transfer multiple blocks of data between the data storage device and non-contiguous locations in main memory. However, conventional DMA controllers commonly allow for only a small, limited number of scatter/gather list elements or do not implement scatter/gather capability at all.

In computing environments requiring high reliability data storage and retrieval, it may be necessary or desirable to keep check information for each block of stored data, which can be used to validate that the data has not become corrupted during storage. Although there are many types of check information, one common form is called a checksum. A checksum is the result of a mathematical calculation on a block of data, which produces the same result each time it is calculated. If a checksum is calculated on a block of data that is about to be stored, the checksum is typically stored along with the data. When the data is retrieved, the checksum is recalculated on the retrieved data and compared with the stored checksum. If the newly computed checksum differs from the stored checksum, then the data is known to be corrupt, and remedial measures can be initiated.

In many cases, it is advantageous for data integrity check information computations to be carried out at a very low level in the operating system. For example, these computations may be performed in a device driver, without knowledge of the software entities originally requesting the I/O. The entity requesting the I/O may simply request, for example, that 64 blocks of memory be written to the storage medium starting at a particular block address. The check information is computed and checked by the device driver, and does not appear in the data passed between the requesting entity and the device driver.

Considerable care must be taken in storing data and its associated check information in such a way that they remain consistent on the storage device in the event of a system failure. Significant simplification of this process can be achieved if the check information for a block of data is stored on the device in the same I/O operation that writes that data. One way to do this is to format the storage device so that each block of storage on the device is long enough to hold both the desired data block size, and the desired check information size. For example, if the desired data block size is 512 bytes, and the desired check information size is 8 bytes, then the storage device could be formatted into 520-byte blocks, each of which would hold 512 bytes of data and 8 bytes of check information. In this example the CPU would then issue I/O operations in integral multiples of 520 bytes, with the first 512 bytes being the data for the first block in the I/O, the next 8 bytes being the check information for the first block in the I/O, the next 512 bytes being the data for the second block in the I/O, the next 8 bytes being the check information for the second block in the I/O, and so on.

Currently, implementing check information storage in longer storage block sizes presents a problem. For example, in writing multiple data blocks in one I/O operation, the check information computed by a CPU (for example in a device driver) must be interleaved with the data blocks. As well during a read operation, the interleaved check information must be extracted from the interleaved data, so the device driver can deliver to its clients data free of check information. Even when writing only a single block, the check information must also be included with the data during the write. However, the data arriving to the device driver from the requesting entity does not contain this check information, nor is space reserved for it.

To accomplish a write operation, if the DMA controller does not have scatter/gather capability, then the data must be copied from the main memory locations, provided by the requesting entity, into another buffer that is long enough to hold not only the data, but also the check information for that data. For example, if the requesting entity passed a 512-byte buffer, and the check information comprises 8 bytes, the device driver of the DMA controller must: allocate a 520-byte contiguous buffer, copy the data into it, compute the check information, and place it after the data in the 520-byte buffer. The device driver can then program the DMA controller to carry out the 520-byte I/O operation using the local buffer. For another example, if the device driver is passed a 4096-byte page, the data must be copied 512 bytes at a time into a 4160-byte local buffer, with each 512-byte chunk being immediately followed by its corresponding check information computed by the device driver. However, such copy operations place a burden on the CPU that could otherwise be utilized for other computations.

Even if the DMA controller has scatter/gather capability, implementations often limit the length of the scatter/gather list. Attempting to use scatter/gather capability to interleave check information computed by the device driver with data for a given I/O request may exceed the limits of the scatter/gather list, again requiring data to be copied, or requiring I/O requests to be broken down into multiple smaller requests. For example, in order to write 16 4096-byte pages of data with check information to a storage device (formatted with 520-byte blocks, each comprising 512 bytes of data and 8 bytes of check information), would require 256 scatter/gather list elements, rather than the maximum of 16 required to write those same blocks without the check information (8 blocks per page×16 pages×2 elements per block). Thus, standard DMA controllers having scatter/gather capability do not, in many instances, have sufficient storage to implement a scatter-gather list capable of storing information for data and its associated check information once computed by the device driver. Providing more storage capability to the DMA controller may overcome this problem, but at increased cost in computing efficiency.

What is needed therefore are more efficient methods and apparatus for using direct memory access (DMA) to transfer data and associated check information to and from storage media.

SUMMARY OF THE INVENTION

The present invention provides efficient architectures and methods for using direct memory access (DMA) to store and retrieve data and associated check information in fixed-size blocks on a data storage device.

In accordance with one aspect of the invention, the DMA controller obtains check information from computer main memory rather than computing the check information internally in the DMA controller. For instance, the check information may be computed by the CPU rather than the DMA controller. In accordance with some embodiments of the invention, the DMA controller implements additional registers to specify, for example, the location of check information in computer main memory. The DMA controller itself carries out interleaving of data with its associated check information as it transfers information between main memory and the storage device. To accomplish this, the DMA controller is given instructions for how the interleaving is to take place. In some embodiments of the present invention, the data block length and check information block length to be interleaved for storage are programmed by the CPU. In other embodiments, one or both of these lengths may be implicit in other programmed parameters and/or the formatting of the storage device.

In accordance with another aspect of the invention, in cases where there is no scatter/gather capability, a DMA controller of the invention accepts two main memory addresses corresponding to the check information and the data to be interleaved. More particularly, in accordance with some embodiments, two different start address registers are implemented to store start addresses corresponding to the check information and the data to be interleaved. In other words, the first start address register specifies the start of the data, and the second start address register specifies the start of the check information for that data. In another embodiment, a DMA controller of the invention provides two additional registers specifying how information taken from the two sets of addresses should be interleaved. One such register specifies the data block size to be interleaved within storage on the storage device, while the other register specifies the check information block size to be interleaved within storage on the storage device. In the latter case, after the DMA controller is programmed and the operation is initiated, the controller steps through the data and the check information using the two address registers, writing the first data block and its corresponding check information, then repeating the operation for the second data block, and so on.

In accordance with yet another aspect of the invention, each I/O operation includes the transfer of a number of data blocks. The CPU computes the check information for each block and places each block's check information contiguously one after the other in a check information segment of memory (e.g., buffer) prior to programming the DMA controller. By arranging the check information for all data blocks in one contiguous segment of memory, a single address can specify all the check information for all the data blocks in the I/O operation. By designing the DMA controller to interleave the check information obtained from main memory with the data, no additional scatter/gather elements are required, and neither the data nor the check information need to be copied into local buffers of the DMA controller.

In accordance with yet another aspect of the invention, scatter/gather capability is supported. In some embodiments of the present invention this capability is used to access the data only, and a single check information start address is used to access all check information for a given I/O operation. In these cases, the device driver places all check information for the I/O operation contiguously in a single buffer, while the data is accessed using the scatter/gather list. Other embodiments of the invention implement scatter/gather capability for both data and check information.

In accordance with yet another aspect of the invention, during read operations, DMA controllers of the invention use the above mentioned registers to deconvolute stored data and associated check information into its constituent parts. The data and associated check information is thus extracted from the storage device using a set of interleave criteria (for simplicity the same term is used for the criteria used to interleave and to deconvolute data and associated check information). The separated data blocks and associated check information, are written into a memory external to the DMA controller (for example main memory).

These and other features and advantages of the present invention will be described in more detail below with reference to the associated figures.

BRIEF DESCRIPTION OF THE DRAWINGS

The following detailed description can be more fully understood when considered in conjunction with the drawings in which:

FIG. 2D illustrates an exemplary scatter/gather list that may be used in accordance with the DMA controller architecture illustrated in FIG. 2C.

FIG. 2F illustrates two exemplary scatter/gather lists that may be used in accordance with the DMA controller architecture illustrated in FIG. 2E.

DETAILED DESCRIPTION OF PREFERRED EMBODIMENTS

In the following detailed description of the present invention, numerous specific embodiments are set forth in order to provide a thorough understanding of the invention. However, as will be apparent to those skilled in the art, the present invention may be practiced without these specific details or by using alternate elements or processes. In some descriptions herein, well-known processes, procedures, and components have not been described in detail so as not to unnecessarily obscure aspects of the present invention.

As mentioned, the invention provides efficient architectures and methods for using direct memory access (DMA) to store and retrieve data and associated check information in fixed-size blocks to and from a data storage device. This is accomplished by the use of interleave criteria, provided in registers in the DMA controller. Since fixed-sized storage blocks are specified, with a fixed data size and a fixed check information size per storage block, the interleave criteria can be represented in a form that is significantly more compact than would be the representation of the same interleave using a conventional scatter/gather list. In this invention, representation of the interleave criteria is constrained to fixed-sized blocks, including two segments (e.g. one of data and one of check information). The data and check information block sizes may be different from one another, but their respective sizes do not vary. Thus, for the specific example of interleaving data and check information, the interleave criteria for an entire transfer is represented in a small number of registers, independent of the total size of the transfer. Using a conventional scatter/gather list to express this same constrained interleave would require two scatter/gather list elements for each and every interleaved block (data and check information) involved in the transfer—large transfers would require an inordinate number of scatter/gather list elements.

Figure 1A:
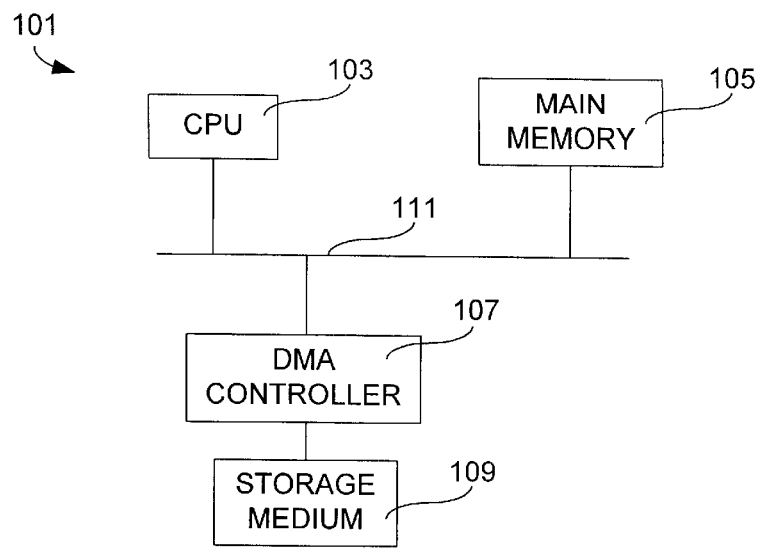
FIG. 1A is a simplified block diagram showing the mechanics of data transfer to and from storage devices using a separate direct memory access (DMA) controller.
Figure 1B:
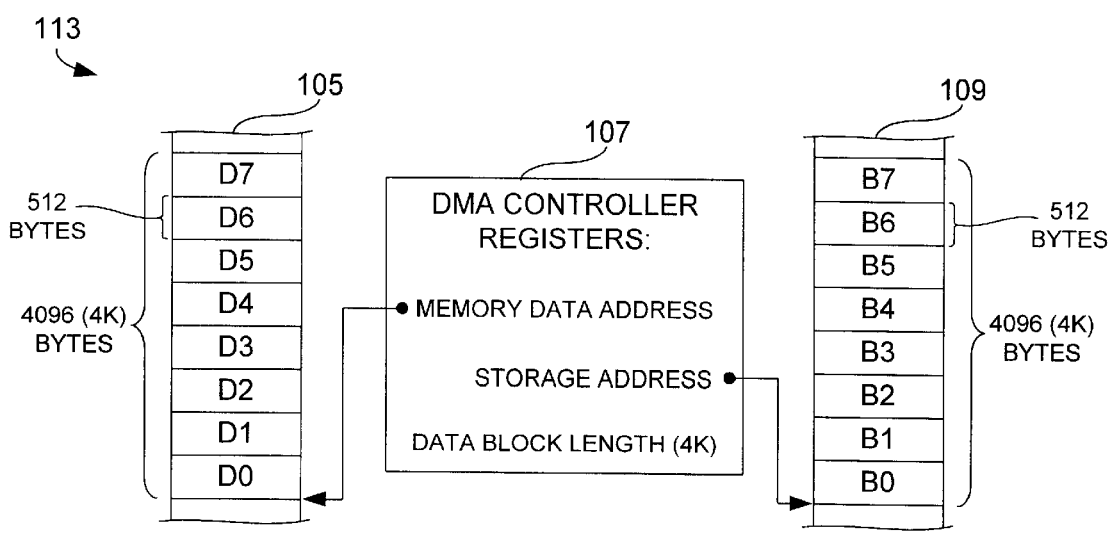
FIG. 1B is a simplified block diagram illustrating a conventional mechanism for transferring data from a main memory to a storage medium via a DMA controller.
Figure 2A:
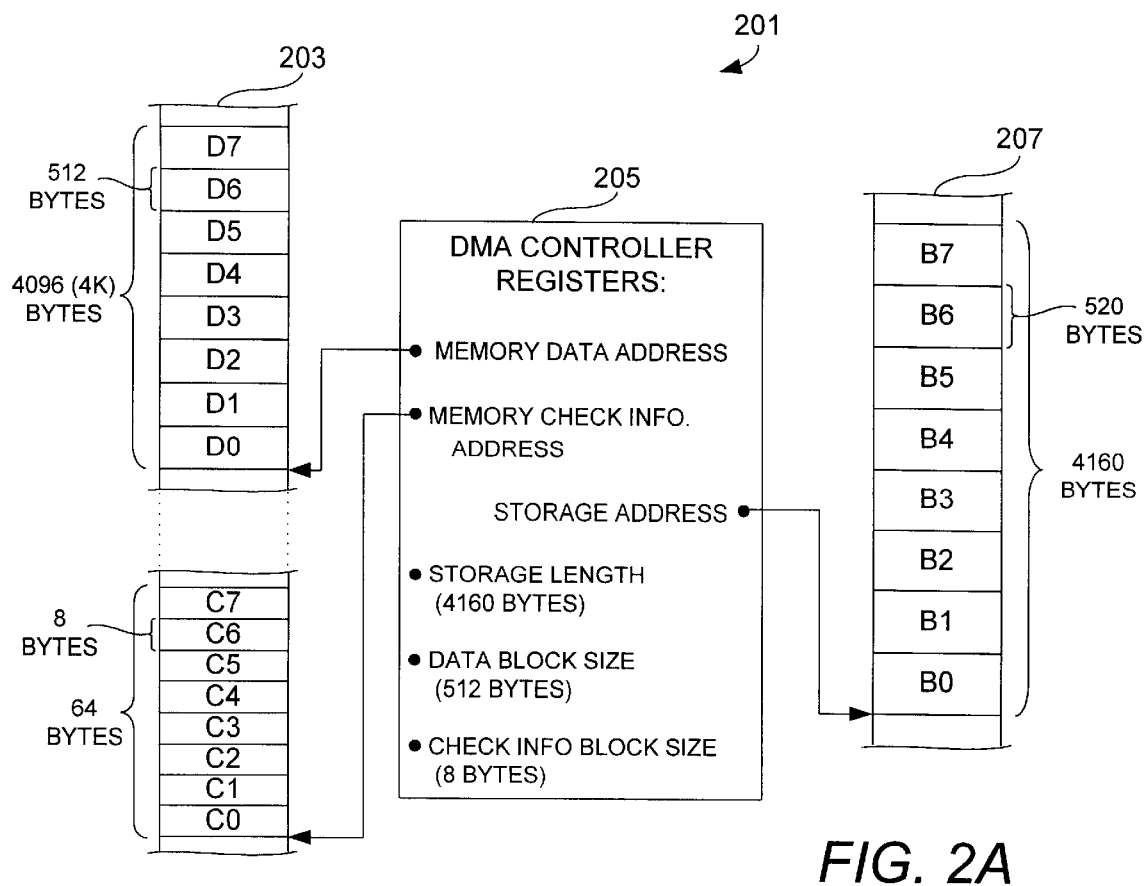
FIG. 2A is a simplified block diagram depicting one DMA controller architecture and aspects of a method for a write operation.

FIG. 2A is a simplified block diagram depicting a DMA controller architecture 201 and aspects of a method for a write operation in accordance with one embodiment of the invention. During a write "DMA transfer", DMA controller 205 transfers data from main memory 203 to storage medium 207. In this example, main memory 203 contains two separate contiguous series of memory segments corresponding to data and its associated check information. More particularly, as shown, the first segment of memory includes data blocks, D0–D7, while the second segment of memory includes associated check information blocks, C0–C7. In one embodiment, the CPU computes the associated check information and stores it contiguously in main memory as C0–C7. DMA controller 205 transfers data blocks D0–D7 (4096 bytes of data) and its associated check information C0–C7 (64 bytes of data) from main memory 203 to storage medium 207. In the transfer process, the data and check information is preferably interleaved and stored as a contiguous set of data blocks B0–B7 (4160 bytes of data). The interleaving process will be discussed in more detail below with reference to FIG. 3A and FIG. 3B.

As depicted in FIG. 2A, DMA controller 205 preferably stores start address data indicating a data start address of the data to be transferred, a check information start address for the check information to be transferred, and a storage address indicating where the interleaved data and check information will be stored. In addition, the DMA controller 205 also preferably stores interleave criteria indicating the length of the data block and the length of the check information block to be interleaved within a storage device. As shown, in accordance with one embodiment, the DMA controller 205 preferably has registers for storing the start address data and the interleave criteria. More specifically, separate registers are preferably used to store both start addresses: the data address and the check information address. Similarly, the interleave criteria is preferably stored in separate registers as the data block size (512 bytes) of the data to be transferred and the associated check information block size (8 bytes) to be transferred. A register is also used for the storage length (4160 bytes) of the interleaved data to be written to the storage device. Alternatively, this register could specify the data length (4096 bytes) with the check length (64 bytes) being implicit based on the interleave criteria. Also alternatively the register could specify that the data block (512 bytes) plus its corresponding check information length (8 bytes) are to be transferred in the interleave eight times, that is, in this example simply the number "8."

In this example of a write operation, the data address and check information address registers are used for storing the main memory start addresses, as indicated. Using the data address and check information registers, the DMA controller of the invention can obtain a data block and its associated check information from main memory 203. The data block size and check information block size (the interleave criteria) are used so that the DMA controller can determine the number of bytes of combined data and check information that is to be sequentially transferred. The storage length can be used by the DMA controller in conjunction with the data block length and check information block length to calculate the amount of data to be transferred by keeping count as each block of data and its associated check information is transferred. As described above, the storage address register initially indicates the starting position where the contiguous blocks of interleaved data are to be stored.

In accordance with one aspect of the invention, the DMA controller does not calculate check information; it interleaves the data and pre-calculated check information, while transferring it to a storage medium. Thus, referring to FIG. 2A, as part of a transfer process, DMA controller 205 obtains data block D0 (512 bytes) and associated check information C0 (8 bytes). In this example, D0 and C0 are interleaved and written to a single block, B0 (520 bytes long) of storage medium 207. This process is repeated, wherein D1 and C1 are converted to B1, which is contiguous with B0, and so on until all the data is transferred. As mentioned above, the registers for storage length, data block size, and check information block size, are used to reset counters and pointers so that the DMA controller can determine the source address from which to obtain data and check information, the destination address of the interleaved data/check information, and when to stop transferring the data and check information. Other methods of keeping track and/or calculating data block length and/or check information block length can be used. In this example, the data block length (512 bytes) and check information block length (8 bytes) were given. In an alternative example, the data block length (512 bytes) and the interleaved block length (520 bytes) can be supplied from which the check information block length can be calculated. Thus, data is interleaved in storage medium 207 using interleave criteria, for example, data and check information block lengths.

Figure 2B:
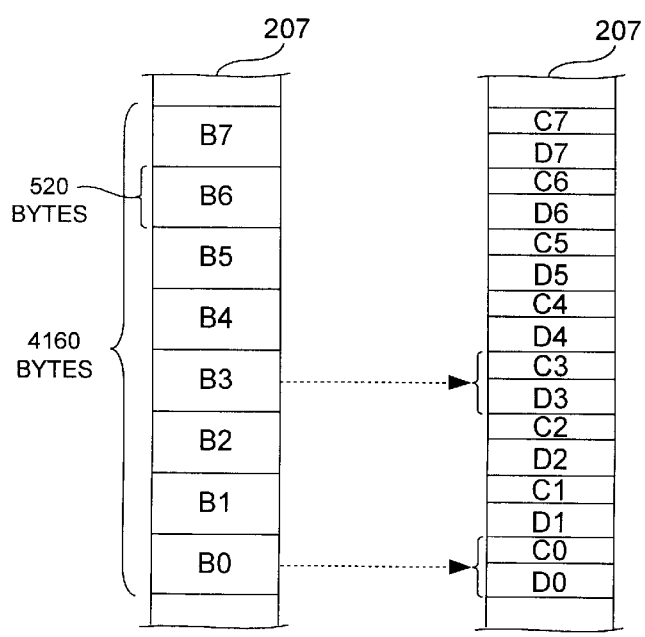
FIG. 2B is a simplified block diagram depicting one exemplary arrangement of interleaved data and check information in a storage medium.

FIG. 2B is a simplified block diagram depicting how the transferred data is arranged in storage medium 207. Blocks B0–B7, each 520 bytes in length, are stored contiguously. Each block is comprised of a data block and its associated check information. For example as depicted, B0 is comprised of D0 and C0 stored contiguously, and B3 is comprised of D3 and C3 stored contiguously. As depicted in FIG. 2B, data blocks D0–D7 and C0–C7 are interspersed alternately, or interleaved when written to storage medium 207.

In an analogous read operation, DMA controller 205 would use the above mentioned registers to deconvolute the stored information B0–B7 into its constituent parts, namely D0–D7 and C0–C7, and write them to back into, for example, main memory 203. Preferably, during a read operation, as each of the individual blocks (data and corresponding check information) is extracted from the interleaved data, they are written to a memory external to the DMA controller, preferably main memory. Put another way, during the read operation, the data is read from the storage device and deconvoluted into two streams of information (data and check information) which are written to memory locations specified by their respective start address. This is one example of how a read process would work; one skilled in the art would understand that such a read process would involve a reversal of the above-described write process.

Figure 2C:
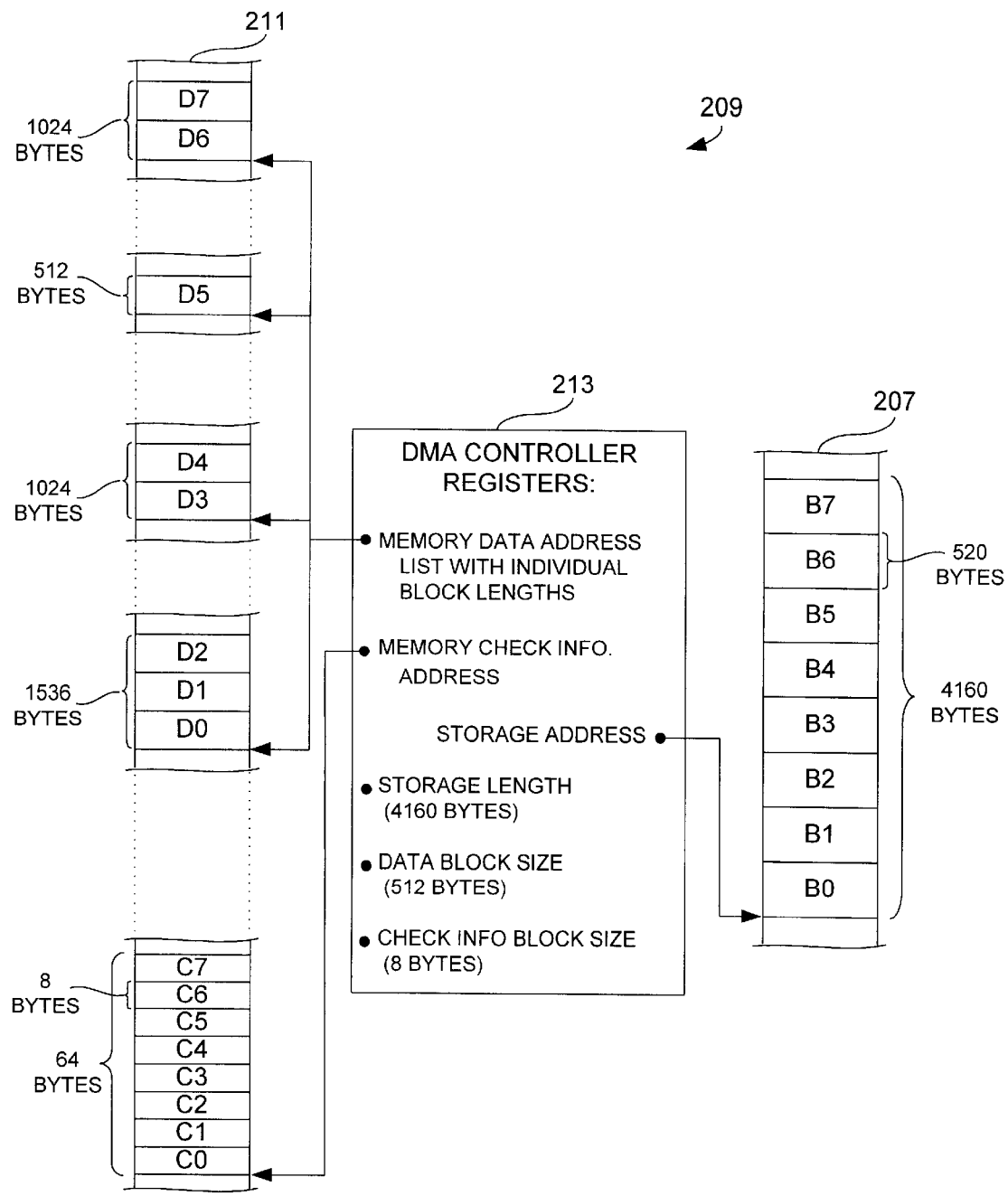
FIG. 2C is a simplified block diagram depicting another DMA controller architecture and aspects of a method for a write operation.

FIG. 2C is a simplified block diagram depicting another DMA controller architecture, 209, and aspects of a method for a write operation. In this example, data blocks D0–D7 are scattered in main memory 211. Specifically, there are contiguous blocks D0–D2, D3–D4, D6–D7, as well as block D5. The associated check information C0–C7 is stored (as in FIG. 2A) in a contiguous format in a separate location in main memory 211.

In this example DMA controller 213 architecture is configured differently than in the previous example; that is, the data address registers account for a data address and a data block length for each of the three contiguous blocks D0–D2, D3–D4, D6–D7, as well as block D5.

In order to carry out a DMA transfer for this type of data arrangement, a scatter-gather list is used. FIG. 2D shows an exemplary scatter-gather list 221 used to implement a DMA transfer of the data blocks D0–D7 and associated check information C0–C7 from main memory 211 to storage medium 207. There are four elements in scatter/gather list 221, numbered 0–3 (as a computer would number them). Elements 0–3 each contain a data block start address and its corresponding block length, providing the dispersion pattern and lengths of the three contiguous sets of data blocks D0–D2, D3–D4, D6–D7, as well as block D5 in main memory 211. During a DMA transfer as described above for FIGS. 2A and 2B, in this case, DMA controller 213 uses scatter/gather list 221 to access data blocks D0–D7 via the data address register. During a DMA write operation, data blocks D0–D7 and check information C0–C7 are transferred in the same manner as described above, and in the process are interleaved and stored in storage medium 207 as blocks B0–B7. Again, an analogous read operation would involve deconvoluting the interleaved data from storage medium 207 by DMA controller 213, using its registers and scatter/gather list 221. The read operation, with respect to the scatter/gather list will be described in more detail below with reference to FIGS. 2E and 2F.

Figure 2E:
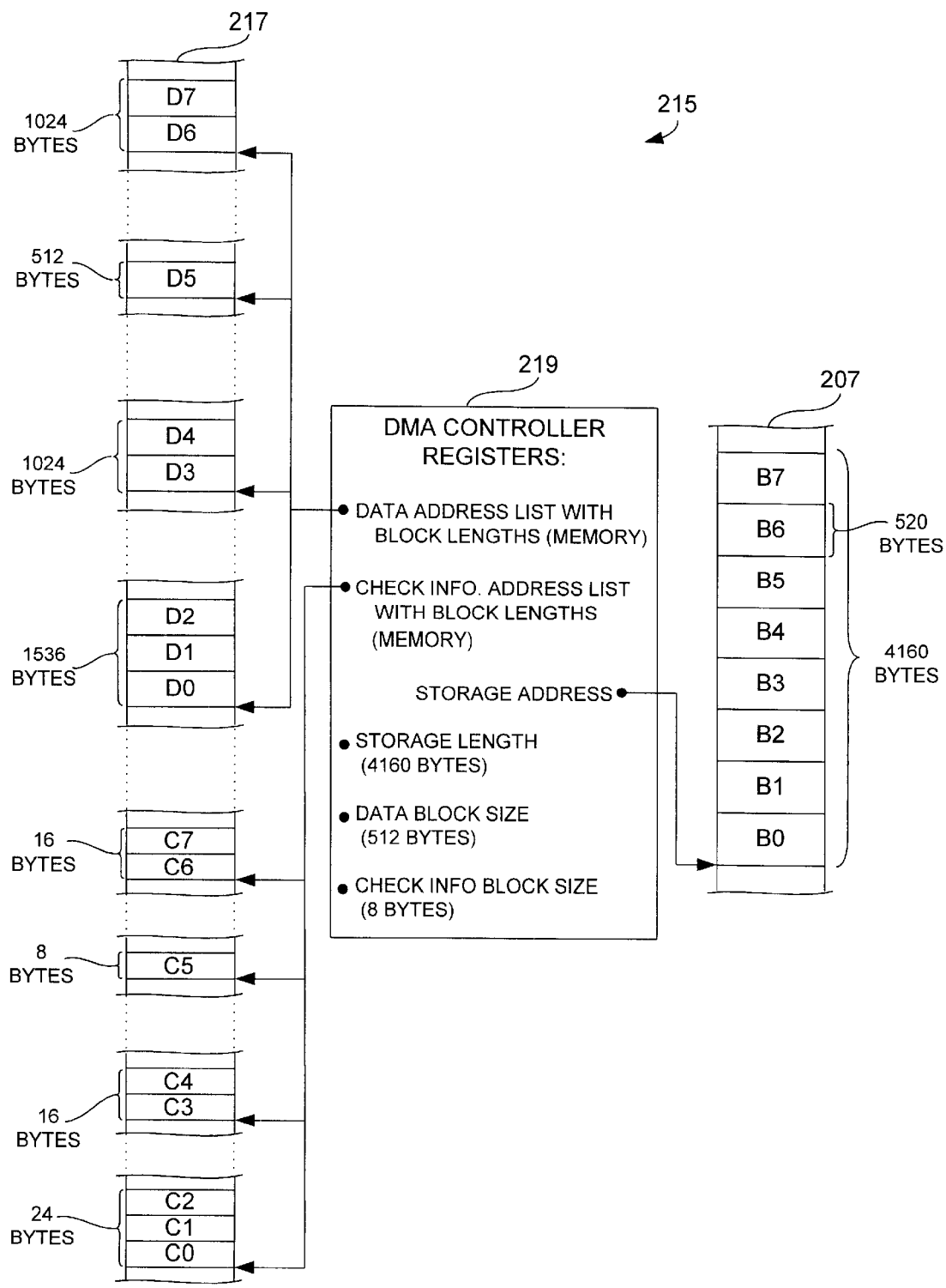
FIG. 2E is a simplified block diagram depicting yet another DMA controller architecture and aspects of a method for a write operation.

Rather than storing check information contiguously, it may be advantageous to be able to access check information that is dispersed in main memory. FIG. 2E is a simplified block diagram depicting yet another DMA controller architecture, 219, and aspects of a method for a write operation. In this example, data blocks D0–D7 are scattered in main memory 217. Specifically, there are contiguous sets of data blocks D0–D2, D3–D4, D6–D7, as well as block D5. The associated check information C0–C7 is also scattered in main memory 217. Specifically, there are contiguous sets of check information blocks C0–C2, C3–C4, C6–C7, as well as block C5. In this example, the dispersion pattern of check information blocks C0–C7 mirrors that of data blocks D0–D7. The check information may be generated and stored in main memory 217 in this way so that the process of allocating memory to contain the check information for the various data blocks can be done most efficiently. As in the previous example, the data address registers are configured to include not only a data block start address but also a corresponding block length. Also in this example, the check information address registers contain not only a check information block start address but also a corresponding block length. Thus, DMA controller 219 works much the same way as described above for FIGS. 2C and 2D, but in this case both the data address register and the check information address register rely on a scatter/gather list to obtain data from main memory 217.

FIG. 2F shows exemplary scatter-gather lists 223 and 225 used to implement a DMA transfer of the data blocks D0–D7 and associated check information C0–C7 from main memory 217 to storage medium 207. There are four elements in scatter-gather list 223, numbered 0–3 and four analogous elements in scatter-gather list 225. In this example, each element 0–3 of the lists contains either a data block start address and its corresponding block length, or a check information block start address and its corresponding block length. Scatter-gather lists 223 and 225 thus provide DMA controller 219 with the dispersion pattern and lengths of the six contiguous blocks D0–D2, D3–D4, D6–D7, C0–C2, C3–C4, C6–C7, as well as blocks D5 and C5 in main memory 217. During a DMA transfer as described above for FIGS. 2C and 2D, in this case, DMA controller uses scatter-gather lists 223 and 225 to access data blocks D0–D7 via the data address register, and C0–C7 via the check information address register, respectively. Data blocks D0–D7 and check information C0–C7 are transferred in the same manner as described above, and in the process are interleaved and stored in storage medium 207 as contiguous blocks B0–B7.

In an exemplary read operation, DMA controller 219 would use the above mentioned registers to deconvolute the stored information B0–B7 into its constituent parts. In this read operation, contiguous blocks D0–D2, D3–D4, D6–D7, C0–C2, C3–C4, C6–C7, as well as blocks D5 and C5, are written to back into, for example, main memory 217. In this case, since scatter/gather lists 223 and 225 were used, the deconvolution process produces two information streams (data and corresponding check information) they are each "scattered" to the locations specified in their respective scatter/gather lists. With respect to FIG. 2C (where only one scatter-gather list was used), only one of the two information streams would be scattered to the locations specified in the scatter-gather list.

Figure 3A:
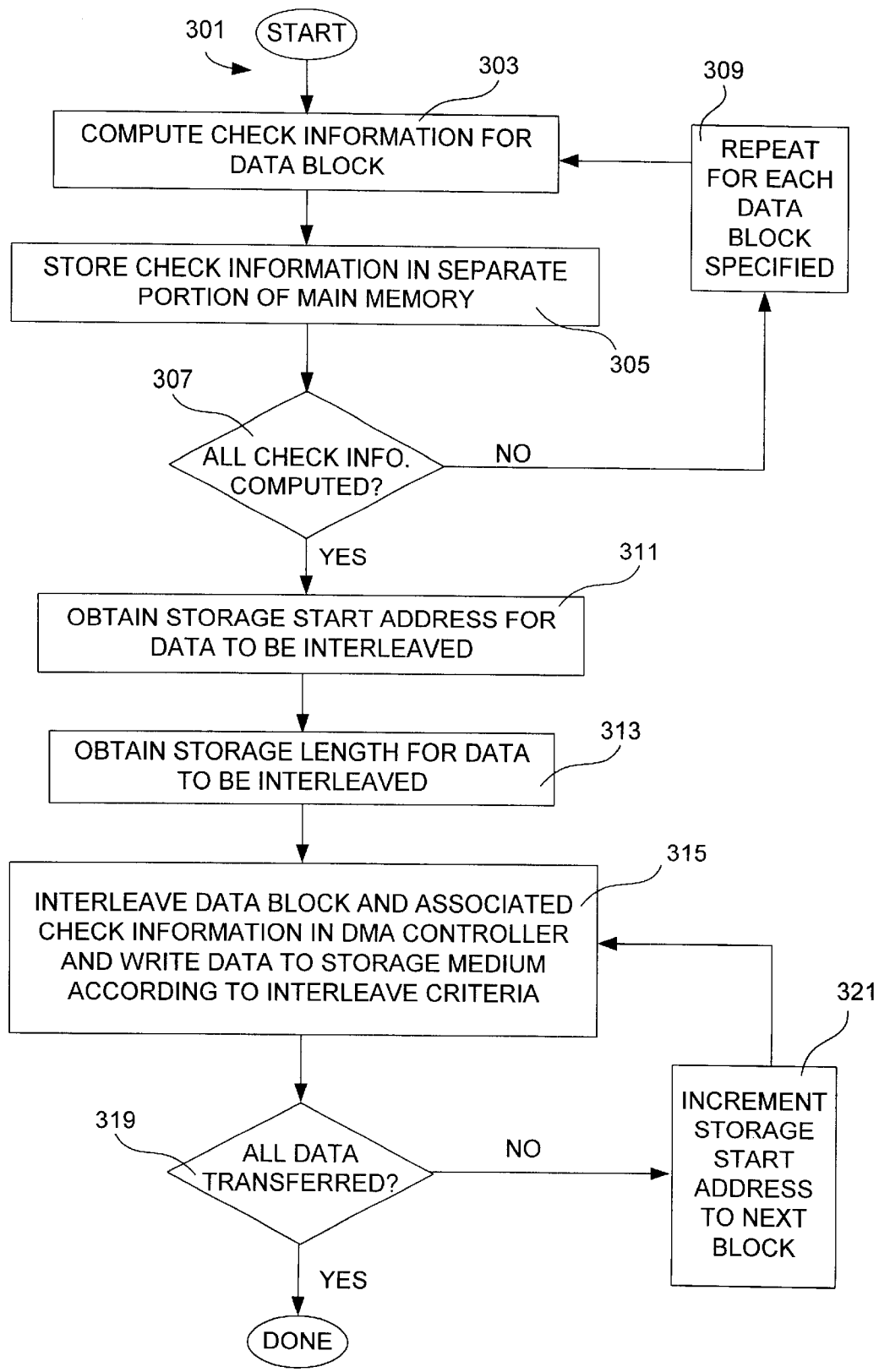
FIG. 3A depicts a process flow showing aspects of a method for transferring data and check information from a main memory to a storage device.

FIG. 3A depicts a process flow, 301, showing aspects of a method for transferring data and check information from a main memory to a storage device in accordance with one embodiment of the invention. In this example, a CPU computes the check information for a data block in main memory at 303. The check information is then stored in a separate portion of main memory at 305. As noted in the examples above, the check information need not be stored contiguously. Next, a decision is made as to whether all the check information has been computed. If the answer is no, then check information is computed for the next specified data block at 309. The process 303–309 is repeated until associated check information has been created for the entire set of desired data blocks. Returning to decision block 307, if all the check information has been calculated, a DMA controller may obtain a storage start address where the data and associated check information is to be stored in the storage medium at 311. Note that the storage address need not be in the DMA controller. For example the storage device can receive this directly from a CPU in some applications, or the storage device may simply write to the storage medium starting at an implicit current location. Next, the DMA controller may also obtain storage length information for the data to be interleaved and stored at 313. At block 315, a data block and its associated check information are interleaved and stored contiguously in a storage medium by the DMA controller and the storage device. At block 319, a decision is made as to whether all data and associated check information has been transferred to the storage medium. If no, then the storage start address is incremented. Blocks 315–321 are repeated for every data block and its associated check information to be transferred from main memory to the storage medium. Returning to block 319, if all the data (and associated check information) has been transferred, then the method is done.

Figure 3B:
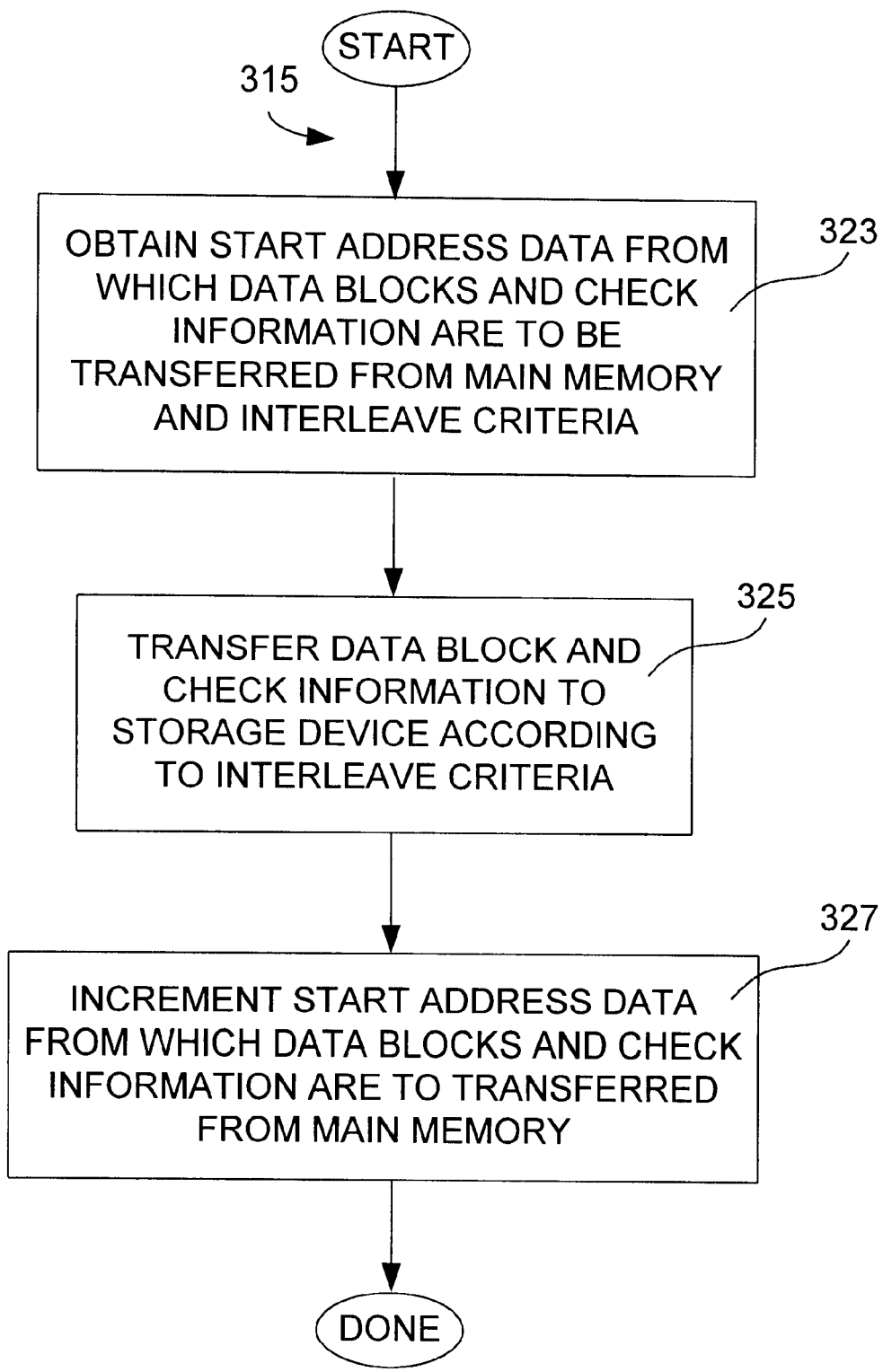
FIG. 3B depicts a process flow showing aspects of a method in which a data block and its associated check information are interleaved by a DMA controller of the invention.

FIG. 3B depicts aspects of the process step 315 from FIG. 3A. Start address data indicating addresses in main memory for the data blocks and their associated check information is obtained at 323. Then the data block and its check information are transferred to a storage device according to interleave criteria at 325. Next, the address data indicating start addresses of the data blocks and check information are incremented so that any subsequent transfers are directed to the correct addresses in main memory at 327. As the process illustrated in FIG. 3A continues through the loop designated by blocks 315–321, each subsequent data block and associated check information are interleaved and the start address data is incremented as illustrated in FIG. 3B.

Embodiments of the present invention employ various processes involving data stored in or transferred through one or more computer systems. Embodiments of the present invention also relate to the apparatus for performing these operations. The computer apparatus of this invention may be specially constructed for the required purposes, or it may be a general-purpose computer selectively activated or reconfigured by a computer program and/or data structure stored in the computer. The processes presented herein are not inherently related to any particular computer. In particular, various general-purpose machines may be used with programs written in accordance with the teachings herein, or it may be more convenient to construct a more specialized apparatus to perform the required method steps.

In addition, embodiments of the present invention relate to computer readable media or computer program products that include program instructions and/or data (including data structures) for performing various computer-implemented operations. Examples of computer-readable media include, but are not limited to, magnetic media such as hard disks, floppy disks, and magnetic tape; optical media such as CD-ROM disks; magneto-optical media; semiconductor memory devices, and hardware devices that are specially configured to store and perform program instructions, such as read-only memory devices (ROM) and random access memory (RAM). The data and program instructions of this invention may also be embodied on a carrier wave or other transport medium. Examples of program instructions include both machine code, such as produced by a compiler, and files containing higher level code that may be compiled or executed by the computer using an interpreter.

Figure 4:
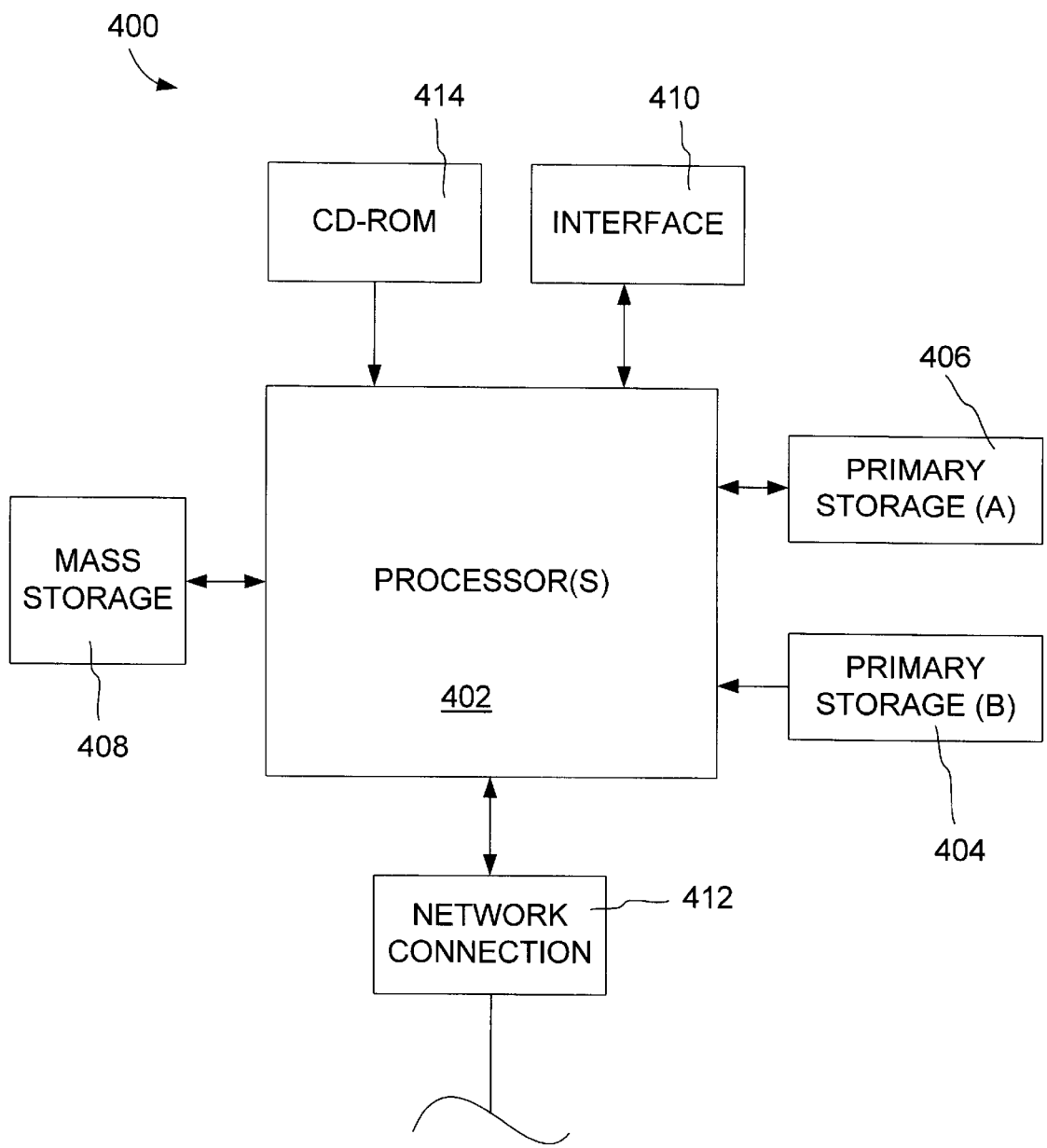
FIG. 4 illustrates a typical computer system that, when appropriately configured or designed, can serve as a computer system in which the invention may be embodied.

FIG. 4 illustrates a typical computer system that, when appropriately configured or designed, can serve as a computer system in which the invention may be embodied. The computer system 400 includes any number of processors 402 (also referred to as central processing units, or CPUs) that are coupled to storage devices including primary storage 406 (typically a random access memory, or RAM), primary storage 404 (typically a read only memory, or ROM). CPU 402 may be of various types including microcontrollers and microprocessors such as programmable devices (e.g., CPLDs and FPGAs) and unprogrammable devices such as gate array ASICs or general purpose microprocessors. As is well known in the art, primary storage 404 acts to transfer data and instructions uni-directionally to the CPU and primary storage 406 is used typically to transfer data and instructions in a bi-directional manner. Both of these primary storage devices may include any suitable computer-readable media such as those described above. A mass storage device 408 may also be coupled bi-directionally to CPU 402 and provides additional data storage capacity and may include any of the computer-readable media described above. Mass storage device 408 may be used to store programs, data and the like and is typically a secondary storage medium such as a hard disk. It will be appreciated that the information retained within the mass storage device 408, may, in appropriate cases, be incorporated in standard fashion as part of primary storage 406 as virtual memory. A specific mass storage device such as a CD-ROM 414 may also pass data uni-directionally to the CPU.

CPU 402 may also be coupled to an interface 410 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 402 optionally may be coupled to an external device such as a database or a computer or telecommunications network using an external connection as shown generally at 412. With such a connection, it is contemplated that the CPU might receive information from the network, or might output information to the network in the course of performing the method steps described herein.

DMA controllers of the invention may be integrated into computer system 400 in many arrangements and configurations, as would be understood by one skilled in the art. Moreover, the above-described process steps may be performed by circuits designed to perform the above steps. In addition, a bus may be used for transferring data and check information between main memory and the storage medium.

While this invention has been described in terms of a few preferred embodiments, it should not be limited to the specifics presented above. Many variations on the above-described preferred embodiments may be employed. Therefore, the invention should be broadly interpreted with reference to the following claims.

What is claimed is:

1. In a direct memory access controller, a method of transferring a data set and an associated set of check information, comprising:
   (a) obtaining the data set from a memory, the memory being external to the direct memory access controller;
   (b) obtaining the associated set of check information from the memory;
   (c) interleaving the data set and the associated set of check information to create an interleaved data set in a storage medium;
   wherein (c) is performed using a set of interleave criteria, said interleave criteria specifying either directly or indirectly a data block size for each block of the data set, and a check information block size for each block of the associated set of check information.

2. The method of claim 1, wherein the memory corresponds to a main memory and the interleaved data set is stored in a storage medium separate from the main memory.

3. The method of claim 2, wherein the data set comprises contiguous blocks of data which reside in the memory beginning at a first memory location and the associated check information comprises contiguous blocks of check information which reside in the memory beginning at a second memory location.

4. The method of claim 3, wherein obtaining the data set and the associated set of check information comprises using a first register indicating a data set start address, and a second register indicating the associated set of check information start address.

5. The method of claim 4, further comprising using one or more registers for indicating at least one of: a storage address indicating an address in the storage medium where the interleaved data set is to be stored, a storage length, the data block size, and the check information block size.

6. The method of claim 5, wherein the interleaved data set is stored contiguously in the storage medium.

7. The method of claim 6, wherein the data set comprises a plurality of scattered data blocks and the associated check information comprises a set of contiguous check information blocks.

8. The method of claim 7, wherein obtaining the data set and the associated set of check information comprises using:
   a scatter-gather list, wherein each element of the scatter-gather list includes an address and a length of a contiguous set of one or more data blocks; and
   a register indicating the start address of the associated set of check information.

9. The method of claim 8, further comprising using one or more registers for indicating at least one of: a storage address indicating an address in the storage medium where the interleaved data set is stored, a storage length, the data block size, and the check information block size.

10. The method of claim 9, wherein the interleaved data set is stored contiguously in the storage medium.

11. The method of claim 2, wherein the data set comprises a first plurality of scattered data blocks and the associated check information comprises a second plurality of scattered check information blocks.

12. The method of claim 11, wherein obtaining the data set and the associated set of check information comprises using a first scatter-gather list, for indicating start address and length information for each data block or any contiguous sets of data blocks of the first plurality of scattered data blocks, and a second scatter-gather list for indicating start address and length information for each check information block or any contiguous sets of check information blocks of the second plurality of scattered check information blocks.

13. The method of claim 12, further comprising using one or more registers for indicating at least one of a storage address indicating an address in the storage medium where the interleaved data set is to be stored, a storage length, the data block size, and the check information block size.

14. The method of claim 13, wherein the interleaved data set is stored contiguously in the storage medium.

15. The method of claim 11, wherein obtaining the data set and the associated set of check information comprises using a scatter-gather list, wherein each element of the scatter-gather list indicates an address and a length of a contiguous set of one or more data blocks from the first plurality of scattered data blocks, and an address and a length of a corresponding contiguous set of one or more check information blocks from the second plurality of scattered check information blocks.

16. The method of claim 15, further comprising using one or more registers for indicating at least one of a storage address indicating an address in the storage medium where the interleaved data set is to be stored, a storage length, the data block size, and the check information block size.

17. The method of claim 16, wherein the interleaved data set is stored contiguously in the storage medium.

18. The method of claim 1, wherein the interleaved data set is stored contiguously in the storage medium.

19. The method of claim 1, wherein the storage medium comprises fixed-size blocks.

20. In a direct memory access controller, a method of transferring a data set and an associated set of check information, comprising:
(a) obtaining an interleaved data set from a storage medium;
(b) deconvoluting the interleaved data set to obtain a data set and an associated set of check information;
(c) writing the data set and the associated set of check information to a memory;
wherein (b) is performed using a set of interleave criteria, said interleave criteria specifying either directly or indirectly a data block size for each block of the data set, and a check information block size for each block of the associated set of check information.

21. The method of claim 20, wherein the memory corresponds to a main memory and the storage medium is separate from the main memory.

22. The method of claim 21, wherein (c) comprises writing the data set as contiguous blocks of data beginning at a first memory location and writing the associated check information as contiguous blocks of check information beginning at a second memory location.

23. The method of claim 22, further comprising using a first register indicating a data set start address, and a second register indicating the associated set of check information start address.

24. The method of claim 23, further comprising using one or more registers for indicating at least one of: a storage address indicating an address in the storage medium where the interleaved data set is stored, a storage length, the data block size, and the check information block size.

25. The method of claim 24, wherein the interleaved data set is stored contiguously in the storage medium.

26. The method of claim 21, wherein (c) comprises writing the data set as a plurality of scattered data blocks and writing the associated check information as a contiguous set of check information blocks.

27. The method of claim 26, wherein (c) comprises using:
a scatter-gather list, wherein each element of the scatter-gather list includes an address and a length of a contiguous set of one or more data blocks; and
a register indicating the start address of the associated set of check information.

28. The method of claim 27, further comprising using one or more registers for indicating at least one of: a storage address indicating an address in the storage medium where the interleaved data set is stored, a storage length, the data block size, and the check information block size.

29. The method of claim 28, wherein the interleaved data set is stored contiguously in the storage medium.

30. The method of claim 21, wherein wherein (c) comprises writing the data set as a first plurality of scattered data blocks and the associated check information as a second plurality of scattered check information blocks.

31. The method of claim 30, wherein (c) comprises using a first scatter-gather list, for indicating start address and length information for each data block or any contiguous sets of data blocks of the first plurality of scattered data blocks, and a second scatter-gather list for indicating start address and length information for each check information block or any contiguous sets of check information blocks of the second plurality of scattered check information blocks.

32. The method of claim 31, further comprising using one or more registers for indicating at least one of a storage address indicating an address in the storage medium where the interleaved data set is stored, a storage length, the data block size, and the check information block size.

33. The method of claim 32, wherein the interleaved data set is stored contiguously in the storage medium.

34. The method of claim 30, wherein (c) comprises using a scatter-gather list, wherein each element of the scatter-gather list indicates an address and a length of a contiguous set of one or more data blocks from the first plurality of scattered data blocks, and an address and a length of a corresponding contiguous set of one or more check information blocks from the second plurality of scattered check information blocks.

35. The method of claim 34, further comprising using one or more registers for indicating at least one of a storage address indicating an address in the storage medium where the interleaved data set is stored, a storage length, the data block size, and the check information block size.

36. The method of claim 35, wherein the interleaved data set is stored contiguously in the storage medium.

37. The method of claim 20, wherein the interleaved data set is stored contiguously in the storage medium.

38. The method of claim 20, wherein the storage medium comprises fixed-size blocks.

39. In a computer system, a method for transferring a plurality of data blocks and associated check information from a main memory to a storage medium, the method comprising:
(a) computing a check information block for one of a plurality of data blocks in the main memory;
(b) storing the check information block in the main memory;
(c) repeating (a) and (b) for each block of the plurality of data blocks in the main memory, thereby creating a set of check information blocks in the main memory, each one of the set of check information blocks corresponding to one of the plurality of data blocks in main memory,
wherein the plurality of data blocks and the set of check information blocks collectively form a data set;

(d) storing one of the plurality of data blocks and one of the set of check information blocks corresponding to that data block contiguously in the storage medium at a storage address in the storage medium using a set of interleave criteria, via the DMA controller;

(e) incrementing the storage address using the set of interleave criteria; and (f) repeating (d)–(e) until all of the data set has been transferred.

40. The method of claim 39, wherein the storage medium comprises a collection of fixed-size blocks.

41. The method of claim 40, wherein storing one of the plurality of data blocks and one of the set of check information blocks corresponding to the data block using a set of interleave criteria comprises:

obtaining a data start address from which one data block or a contiguous set of data blocks of the plurality of data blocks is to be transferred;

obtaining a check information block start address from which one associated check information block or a contiguous set of associated check information blocks is to be transferred;

transferring a data block and its associated check information block to the storage medium in contiguous format; and incrementing the data start address and check information block start address in the main memory;

wherein the set of interleave criteria indicates length information of one or more of the plurality of data blocks to be transferred and length information of one or more of the set of associated check information blocks to be transferred, and incrementing the data start address and check information block start address comprises adding each of the length information of one or more of the plurality of data blocks to be transferred and length information of one or more of the set of associated check information blocks to be transferred to each of the data start address and check information start address.

42. The method of claim 39, wherein (a)–(c) are performed by a CPU.

43. In a computer system, a method for transferring a contiguously stored data set, having a set of data blocks and a set of associated check information blocks which are interleaved, from a storage medium to a main memory, the method comprising:

(a) obtaining the contiguously stored data set from the storage medium;

(b) deconvoluting the contiguously stored data set to obtain the set of data blocks and the set of associated check information blocks using a set of interleave criteria; and (c) writing the set of data blocks and the set of associated check information blocks to the main memory;

wherein (b) is performed in a direct access memory controller which contains a plurality of registers, said plurality of registers specifying either directly or indirectly at least a data block size for each block of the set of data blocks, and a check information block size for each block of the set of associated check information blocks.

44. The method of claim 43, wherein the storage medium comprises a collection of fixed-size blocks.

45. The method of claim 44, wherein (b)–(c) comprise:

(d) obtaining a data start address to which one data block or a contiguous set of data blocks of the plurality of data blocks is to be transferred;

(e) obtaining a check information block start address to which one associated check information block or a contiguous set of associated check information blocks is to be transferred;

(f) transferring a data block and its associated check information block to the main memory;

(g) incrementing the data start address and check information block start address in the main memory; and (h) repeating (d)–(g) until all of the data set has been transferred.

wherein the set of interleave criteria indicates length information of one or more of the plurality of data blocks to be transferred and length information of one or more of the set of associated check information blocks to be transferred, and incrementing the data start address and check information block start address comprises adding each of the length information of one or more of the plurality of data blocks to be transferred and length information of one or more of the set of associated check information blocks to be transferred to each of the data start address and check information start address.

46. The method of claim 45, wherein the check information is recomputed for each data block transferred in (f), and compared with the corresponding check information block transferred in (f) in order to verify the accuracy of the transfers.

47. The method of claim 46, wherein recomputation of the check information and comparison with the transferred check information blocks are performed by a CPU.

48. A computer-readable medium storing thereon instructions for transferring a data set and an associated set of check information in a direct memory access controller, the computer-readable medium comprising:

instructions for obtaining the data set from a memory external to the direct memory access controller;

instructions for obtaining the associated set of check information from the memory; and instructions for interleaving the data set and the associated set of check information to create an interleaved data set in a storage medium.

49. An apparatus for transferring a data set and an associated set of check information in a direct memory access controller, comprising:

means for obtaining the data set from a memory external to the direct memory access controller;

means for obtaining the associated set of check information from the memory; and means for interleaving the data set and the associated set of check information to create an interleaved data set in a storage medium.

50. A direct memory access controller for transferring data between a main memory and a data storage device, the DMA controller comprising:

a first register for storing a start address, from which data is to be transferred from the main memory to the data storage device or to which the data is to be written to the main memory from the data storage device;

a second register for storing a start address from which check information is to be transferred from the main memory to the data storage device or to which the data is to be written to the main memory from the data storage device;

means for specifying or determining a length of the data in each data block to be transferred from the main memory to the data storage device or from the storage device to the main memory; and means for specifying or determining a length of the check information in each check information block to be transferred from the main memory to the data storage device or from the storage device to the main memory.

51. The DMA controller of claim 50, further comprising;

a source bit indicating whether a current DMA address source is from the first register or the second register.

52. The DMA controller of claim 50, further comprising a scatter-gather list, wherein each element of the list indicates an address and a length of a contiguous set of data to be transferred from the main memory to the data storage device or from the storage device to the main memory.

53. The DMA controller of claim 50, further comprising:

a first scatter-gather list, wherein each element of the first scatter-gather list indicates an address and a length of a contiguous collection of data to be transferred from the main memory to the data storage device or from the storage device to the main memory; and a second scatter-gather list, wherein each element of the second scatter-gather list indicates an address and a length of a contiguous collection of check information to be transferred from the main memory to the data storage device or from the storage device to the main memory.

54. The DMA controller of claim 50, further comprising a scatter-gather list, wherein each element of the list indicates an address and a length of a contiguous set of data to be transferred from the main memory to the data storage device or from the storage device to the main memory, and an address and a length of a corresponding contiguous set of check information to be transferred from the main memory to the data storage device or from the storage device to the main memory.

55. A computer-readable medium storing thereon instructions for transferring a contiguously stored data set, having a set of data blocks and a set of associated check information blocks which are interleaved, from a storage medium to a main memory, the computer-readable medium comprising:

instructions for obtaining the contiguously stored data set from the storage medium;

instructions for deconvoluting the contiguously stored data set to obtain the set of data blocks and the set of associated check information blocks using a set of interleave criteria; and instructions for writing the set of data blocks and the set of associated check information blocks to the main memory.

56. An apparatus for transferring a contiguously stored data set, having a set of data blocks and a set of associated check information blocks which are interleaved, from a storage medium to a main memory, comprising:

means for obtaining the contiguously stored data set from the storage medium;

means for deconvoluting the contiguously stored data set to obtain the set of data blocks and the set of associated check information blocks using a set of interleave criteria; and means for writing the set of data blocks and the set of associated check information blocks to the main memory.

* * * * *